(12) United States Patent
Kim

(10) Patent No.: US 10,177,399 B2
(45) Date of Patent: Jan. 8, 2019

(54) SECONDARY BATTERY

(71) Applicant: SAMSUNG SDI CO., LTD., Yongin-si, Gyeonggi-do (KR)

(72) Inventor: Daekyu Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 129 days.

(21) Appl. No.: 15/441,502

(22) Filed: Feb. 24, 2017

(65) Prior Publication Data

US 2017/0250437 A1    Aug. 31, 2017

(30) Foreign Application Priority Data

Feb. 29, 2016  (KR) .................. 10-2016-0024475

(51) Int. Cl.
| | |
|---|---|
| *H01M 10/02* | (2006.01) |
| *H01M 2/02* | (2006.01) |
| *H01M 10/052* | (2010.01) |
| *H01M 10/0587* | (2010.01) |
| *H01M 2/16* | (2006.01) |
| *H01M 10/04* | (2006.01) |

(52) U.S. Cl.
CPC ......... *H01M 10/02* (2013.01); *H01M 2/0202* (2013.01); *H01M 2/1686* (2013.01); *H01M 10/0431* (2013.01); *H01M 10/052* (2013.01); *H01M 10/0587* (2013.01); *H01M 2220/30* (2013.01)

(58) Field of Classification Search
CPC ............. H01M 10/02; H01M 10/0431; H01M 2/1686; H01M 10/0587; H01M 10/052; H01M 2/0202; H01M 2220/30
See application file for complete search history.

(56) References Cited

U.S. PATENT DOCUMENTS

| | | | |
|---|---|---|---|
| 2007/0154787 A1* | 7/2007 | Jang ..................... | H01M 2/046 429/94 |
| 2010/0291432 A1* | 11/2010 | Kim .................. | H01M 10/0431 429/163 |
| 2011/0008672 A1* | 1/2011 | Kim .................... | H01M 2/0277 429/174 |
| 2011/0064995 A1* | 3/2011 | Kim ....................... | H01M 2/08 429/174 |

(Continued)

FOREIGN PATENT DOCUMENTS

| | | |
|---|---|---|
| KR | 10-2007-0096649 | 10/2007 |
| KR | 10-2012-0035090 | 4/2012 |
| KR | 10-2015-0004678 | 1/2015 |

*Primary Examiner* — Stewart A Fraser
(74) *Attorney, Agent, or Firm* — Lee & Morse, P.C.

(57) ABSTRACT

A secondary battery includes an electrode assembly including a first electrode plate, a second electrode plate, and a separator between the first electrode plate and the second electrode plate, a case in which the electrode assembly and an electrolyte are received, and a finishing member attached to an outer surface of the electrode assembly. The finishing member includes a first layer, a second layer, and a third layer. The first layer has one surface attached to the electrode assembly. The second layer and the third layer are different from each other and are sequentially provided on another surface of the first layer. The second layer and the third layer react to the electrolyte.

13 Claims, 7 Drawing Sheets

(56) References Cited

U.S. PATENT DOCUMENTS

| | | | |
|---|---|---|---|
| 2011/0287302 A1* | 11/2011 | Kim | H01M 2/022 429/163 |
| 2013/0202932 A1* | 8/2013 | Song | H01M 2/0287 429/94 |
| 2015/0010797 A1 | 1/2015 | Kim | |
| 2015/0104684 A1* | 4/2015 | Kim | H01M 2/1022 429/94 |
| 2015/0147640 A1 | 5/2015 | Kim et al. | |

* cited by examiner

SECONDARY BATTERY

CROSS-REFERENCE TO RELATED APPLICATION

Korean Patent Application No. 10-2016-0024475, filed on Feb. 29, 2016, in the Korean Intellectual Property Office, and entitled: "Secondary Battery," is incorporated by reference herein in its entirety.

BACKGROUND

1. Field

One or more embodiments relate to a secondary battery, and more particularly, to a secondary battery that may prevent movement of an electrode assembly and a fracture of an electrode tab.

2. Description of the Related Art

Various batteries have recently been used as power sources of small electronic devices. In particular, batteries using electrolytes, such as lithium secondary batteries that are small and have large capacities, are mainly used as power sources of mobile phones, notebook computers, or camcorders.

SUMMARY

Embodiments are directed to a secondary battery including an electrode assembly including a first electrode plate, a second electrode plate, and a separator between the first electrode plate and the second electrode plate, a case in which the electrode assembly and an electrolyte are received, and a finishing member attached to an outer surface of the electrode assembly. The finishing member includes a first layer, a second layer, and a third layer. The first layer has one surface attached to the electrode assembly. The second layer and the third layer are different from each other and are sequentially provided on another surface of the first layer. The second layer and the third layer react to the electrolyte.

The second layer may be thicker than the first layer and thinner than the third layer.

The third layer may be thicker than the first layer and the second layer.

The first layer may include an acrylic resin.

The second layer may include polyvinylidene fluoride (PVDF) or urethane.

The third layer includes oriented polystyrene (OPS).

In a state in which the finishing member is impregnated with the electrolyte, the third layer may be attached to an inner surface of the case and the second layer may have an increased volume, compared to a state in which the finishing member has not been impregnated with the electrolyte.

The second layer may swell in the state in which the finishing member is impregnated with the electrolyte.

The first electrode plate may include a plurality of uncoated portions to which a first active material is not applied, and a plurality of first electrode tabs respectively attached to the plurality of uncoated portions and extending upwardly.

The finishing member may be provided on at least one surface of the electrode assembly, or the finishing member may be provided on one surface of the electrode assembly and on another surface of the electrode assembly that is opposite to the one surface of the electrode assembly.

The one surface of the electrode assembly may include a portion where a wound end of the electrode assembly is located.

The one surface of the electrode assembly may not a portion of an outer circumferential surface of the electrode assembly where a first electrode tab is located.

The finishing member may be provided to surround an entirety of the outer surface of the electrode assembly.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
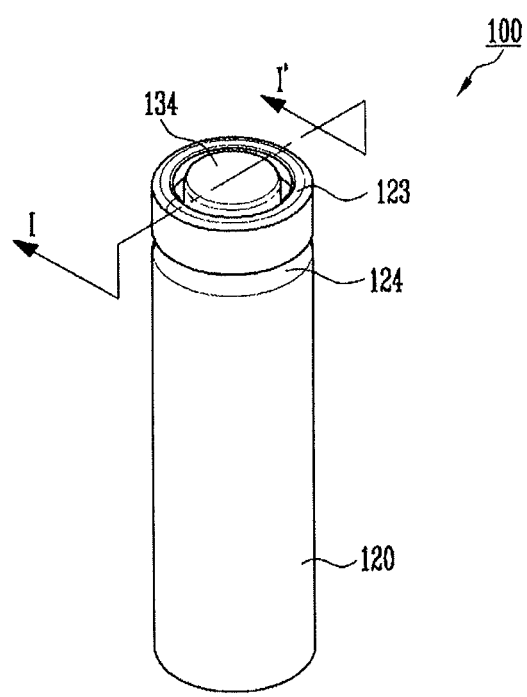
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
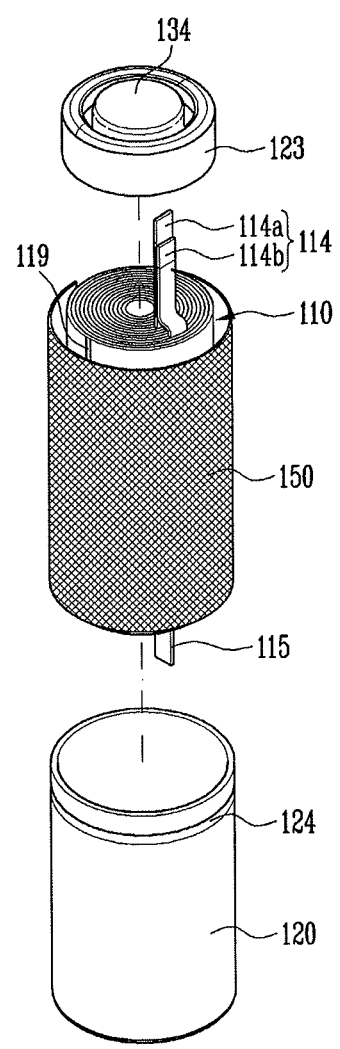
FIG. 2 illustrates an exploded perspective view of the secondary battery of FIG. 1.

FIG. 1 illustrates a perspective view of a secondary battery 100 according to an embodiment. FIG. 2 illustrates an exploded perspective view of the secondary battery 100 of FIG. 1.

As shown in FIGS. 1 and 2, the secondary battery 100 according to an embodiment may include an electrode assembly 110 including a first electrode plate 111, a second electrode plate 112, and a separator 113 disposed between the first electrode plate 111 and the second electrode plate 112, a case 120 in which the electrode assembly 110 and an electrolyte are received, and a finishing member 150 attached to an outer surface of the electrode assembly 110.

The electrode assembly 110 may include the first electrode plate 111, the second electrode plate 112, and the separator 113 that is disposed between the first electrode plate 111 and the second electrode plate 112. The separator 113 may prevent a short-circuit and may allow only movement of lithium ions. In this case, the first electrode plate 111 may include a first active material portion formed by intermittently coating a first active material on a first base material and a first uncoated portion that is not coated with the first active material, such that the first base material is exposed. The first active material may be a positive active material including a transition metal oxide such as $LiCoO_2$, $LiNiO_2$, or $LiMn_2O_4$.

The second electrode plate 112 has a polarity that is different from that of the first electrode plate 111. The second electrode plate 112 includes a second active material portion formed by intermittently coating a second active material on a second base material and a second uncoated portion that is not coated with the second active material, such that the second base material is exposed. The second active material may be a negative active material including graphite or carbon. The first electrode plate 111, the second electrode plate 112, and the separator 113 may be rolled into a jelly-roll shape and may be received in the case 120. The first electrode plate 111 may be a positive electrode plate and the second electrode plate 112 may be a negative electrode plate.

The first electrode plate 111 may include aluminum, the second electrode plate 112 may include copper, and the separator 113 may include polyethylene or polypropylene, as examples. A plurality of first electrode tabs 114 that each protrude upwardly by a predetermined length may be welded to the first uncoated portion of the first electrode plate 111. A second electrode tab 115 that protrudes downwardly by a predetermined length may be welded to the second uncoated portion of the second electrode plate 112. The plurality of first electrode tabs 114 may include an inner tab 114a that is relatively close to a central axis of the electrode assembly 110 and an outer tab 114b that is relatively far from the central axis of the electrode assembly 110. The inner tab 114a and the outer tab 114b may be aligned at the same side of the central axis of the electrode assembly 110 and may be in an overlapping relationship with each other. The plurality of first electrode tabs 114 that are drawn from a plurality of portions of the electrode assembly 110 and are electrically connected to one another correspond to multi-tabs that may reduce a resistance of the secondary battery 100 in order to increase output power. In this case, the first electrode tabs 114 may be positive electrode tabs and the second electrode tab 115 may be a negative electrode tab, or vice versa. Although one second electrode tab 115 is illustrated, in some implementations, more than one second electrode tab 115 may be provided. Although only one first electrode tab 114, instead of the plurality of first electrode tabs 114, may be provided, the secondary battery 110 according to an embodiment may be more efficiently applied to a multi-tab structure in which the plurality of electrode tabs 114 are provided. Accordingly, for convenience of explanation, the following will be explained on the assumption that the secondary battery 100 has a multi-tab structure.

The separator 113 may have a length long enough to completely insulate the first electrode plate 111 and the second electrode plate 112 even when the electrode assembly 110 contracts and expands.

The electrode assembly 110 may be rolled into a cylindrical jelly-roll shape. An outside of the electrode assembly 110 may include a wound end 119 where winding of the electrode assembly ends. A predetermined space may be formed at the center of the electrode assembly 110. A center pin 140 having a rod shape in which a hollow portion is formed may be located in the predetermined space. The center pin 140 may support the electrode assembly 110 such that the electrode assembly 110 does not become unfastened. A lower end portion of the center pin 140 may press the second electrode tab 115 downwardly such that the second electrode tab 115 is closely attached to the case 120. The electrode assembly 110 may be inserted into the case 120 and the center pin 140 may be inserted into the central space of the electrode assembly 110. Accordingly, the center pin 140 may enable the second electrode tab 115 to be closely attached to the case 20 and may support the electrode assembly 110 such that the electrode assembly 110 having a jelly-roll shape does not become unfastened.

The case 120 may have a substantially cylindrical shape. The case 120 may have a cylindrical surface having a predetermined diameter and a bottom surface having a substantially circular plate shape at the bottom of the case 120. The top of the case 120 may be open. Accordingly, the electrode assembly 110 may be introduced into the case 120 through the top of the case 120 having a cylindrical shape. The second electrode tab 115 of the electrode assembly 110 may be welded to the bottom surface of the case 120, and the case 120 may act as a negative electrode. In some implementations, the first electrode tabs 114 may be welded to the bottom surface of the case 120, such that the case 120 may act as a positive electrode. Although the case 120 has a cylindrical shape in FIG. 1, in some implementations, the case 120 may have any of various others shapes, for example, a rectangular parallelepiped shape, a pouch shape, or a coin shape.

A cap assembly 130 may be coupled to the top of the case 120. The cap assembly 130 may include a safety vent 131, a circuit board 132, a positive temperature coefficient element 133, a cap-up 134, an insulating gasket 135, and a cap-down 136. The safety vent 131 may be deformable or breakable to discharge gas to the outside or damage the circuit board 132 located over the safety vent 131 when an inner pressure of the case 120 is increased. When the safety vent 131 is broken or damaged, the circuit board 132 may also be damaged, thereby cutting off current flowing through the secondary battery 100.

The positive temperature coefficient element 133, which prevents an over-current, is located on the circuit board 132. The cap-up 134, which is conductive, applies a positive voltage (or a negative voltage). The cap-up 134 may be located over the positive temperature coefficient element 133 and may have a plurality of through-holes through which gas is easily discharged. Portions of the safety vent 131, the circuit board 132, the positive temperature coefficient element 133, the cap-up 134, and the cap-down 136 that face the case 120 may be surrounded by the insulating gasket 135. Accordingly, a direct short-circuit with the case 120 may not occur.

A crimping portion 123 bent inwardly may be formed at the top of the case 120. The crimping portion 123 may press the cap assembly 130 coupled thereto. An inward protrusion portion 124 may be formed in the case 120 at a position corresponding to a top outer peripheral surface of the electrode assembly 110. The inward protrusion portion 124 may press the cap assembly 130 from the bottom portion thereof and prevent the upward deviation of the electrode assembly 110.

A top insulating member 116 may be located at the top surface of the electrode assembly 110, and a bottom insulating member 117 may be located at the bottom surface of the electrode assembly 110. Accordingly, an undesired electrical short between the electrode assembly 110 and the case 120 may be prevented.

The electrolyte may allow lithium ions to move between a positive electrode and a negative electrode in the secondary battery 100 therethrough during a charging/discharging process. The electrolyte may include a salt, a solvent that dissolves the salt, and an additive. The solvent may be an organic solvent. For example, the electrolyte may be a non-aqueous organic electrolyte formed of a compound of a lithium salt and a high-purity organic solvent. In some implementations, the electrolyte may be a polymer using a polymer electrolyte. The finishing member 150 may be provided on at least one portion of the outer surface of the electrode assembly 110 to increase adhesive force with the case 120 and stably maintain a shape of the electrode assembly 110. The at least one portion may be a portion where a wound end 119 of the electrode assembly 110 is located. The finishing member 150 may be provided on the wound end 119 of the electrode assembly 150. Accordingly, the finishing member 150 may help prevent the electrode assembly 110 that is rolled into a jelly-roll shape from becoming unfastened.

The finishing member 150 may include a plurality of layers. For example, the finishing member 150 may include a first layer 152, a second layer 154, and a third layer 156.

A position of the finishing member 150 will now be explained in more detail with reference to FIGS. 2 and 3.

Figure 3:
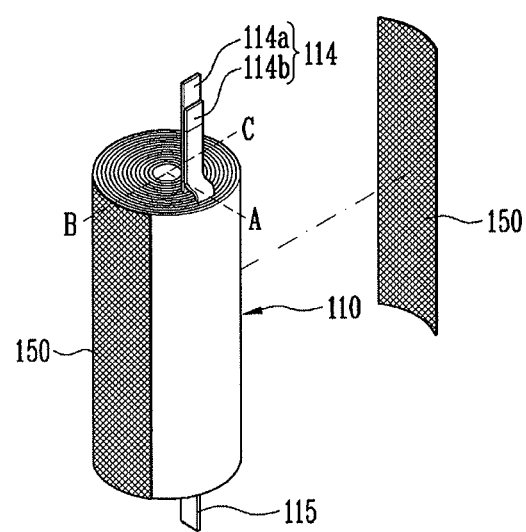
FIG. 3 illustrates a perspective view of a finishing member that is provided on an electrode assembly according to an embodiment.

FIG. 3 illustrates a perspective view of the finishing member 150 provided on the electrode assembly 110 according to an embodiment.

Referring to FIGS. 2 and 3, the electrode assembly 110 according to an embodiment may include the first electrode plate 111, the second electrode plate 112, and the separator 113 disposed between the first electrode plate 111 and the second electrode plate 112. The electrode assembly may be rolled into a cylindrical jelly-roll shape. The inner tab 114a and the outer tab 114b may be welded to the first electrode plate 111 to protrude upwardly from the electrode assembly 110. The second electrode tab 115 may be welded to the second electrode plate 112 to protrude downwardly from the electrode assembly 110. The center pin 140 having a rod shape may be located at the center of the electrode assembly 110 to help prevent unfastening of the electrode assembly 110. Also, the finishing member 150 may be provided on at least one portion of an outer surface of the electrode assembly 110 in order to increase adhesive force with the case 120 and stably maintain a shape of the electrode assembly 110. The at least one portion may be a portion where the wound end 119 of the electrode assembly 110 is located as described above.

As shown in FIG. 2, the finishing member 150 may be attached to the electrode assembly 110 to surround the entire electrode assembly 110 that is rolled.

In some implementations, as shown in FIG. 3, the finishing member 150 may be attached to one surface of the electrode assembly 110, or to one surface and to another surface of the electrode assembly 110 that is opposite to the one surface. A portion of the electrode assembly 110 that affects roundness of the jelly-roll structure may be a portion where the plurality of first electrode tabs 114 are located. Accordingly, the finishing member 150 may be attached to a portion of an outer circumferential surface of the electrode assembly 110 that does not match the portion where the plurality of first electrode tabs 114 are located. For example, when the electrode assembly 110 is seen from above and the plurality of first electrode tabs 114 are located at a 12 o'clock position A in the electrode assembly 110, the finishing member 150 may be attached to a 3 o'clock position B, or to the 3 o'clock position B and a 9 o'clock position C.

The one surface to which the finishing member 150 is attached may include a portion where the wound end 119 of the electrode assembly 110 is located. The finishing member 150 provided on at least one portion of the outer surface of the electrode assembly 110 may prevent the electrode assembly 110 that is rolled into a jelly-roll shape from becoming unfastened. The finishing member may supplement a portion of the electrode assembly 110 that has poor roundness such that the electrode assembly 110 is completely attached to the case 120.

When the finishing member 150 is impregnated with an electrolyte, the finishing member 150 may react to an organic solvent in the electrolyte, and thus may swell and become adhesive.

When at least one surface of the electrode assembly 110 or the entire electrode assembly 110 to which the finishing member 150 is attached is firmly attached to an inner surface of the case 120, an alignment state of the electrode assembly 110 may be stably maintained, a short-circuit may be avoided and an uncharged portion may be prevented from being generated due to swelling.

For example, in a multi-tab structure, when a plurality of first electrode tabs are drawn from a plurality of portions of an electrode assembly and overlap one another, it may be difficult to ensure high roundness of a jelly-roll structure, as compared to a structure in which only a single first electrode tab is drawn from an electrode assembly is used. In a structure using a single first electrode tab, only the thickness of the one first electrode tab affects the roundness of a jelly-roll structure. On the other hand, in a multi-tab structure, a thickness increases in the multi-tab structure as the plurality of first electrode tabs overlap one another, thereby more greatly affecting the roundness of a jelly-roll structure.

When the finishing member 150 according to an embodiment is used, even in a multi-tab structure with relatively low roundness of a jelly-roll structure, at least one surface of the electrode assembly 110 or the entire electrode assembly 110 may be firmly attached to an inner surface of the case 120. Accordingly, an alignment state of the electrode assembly 110 may be stably maintained.

For example, movement of the electrode assembly 110 that is rolled into a jelly-roll shape may be effectively prevented even when the electrode assembly 110 has a multi-tab structure having relatively low roundness.

When movement of a jelly-roll structure is suppressed, a fracture of an electrode tab may be prevented and the stability of a secondary battery may be improved.

A configuration of the finishing member 150 of the secondary battery 100 according to an embodiment will now be explained in detail.

Figure 4A:
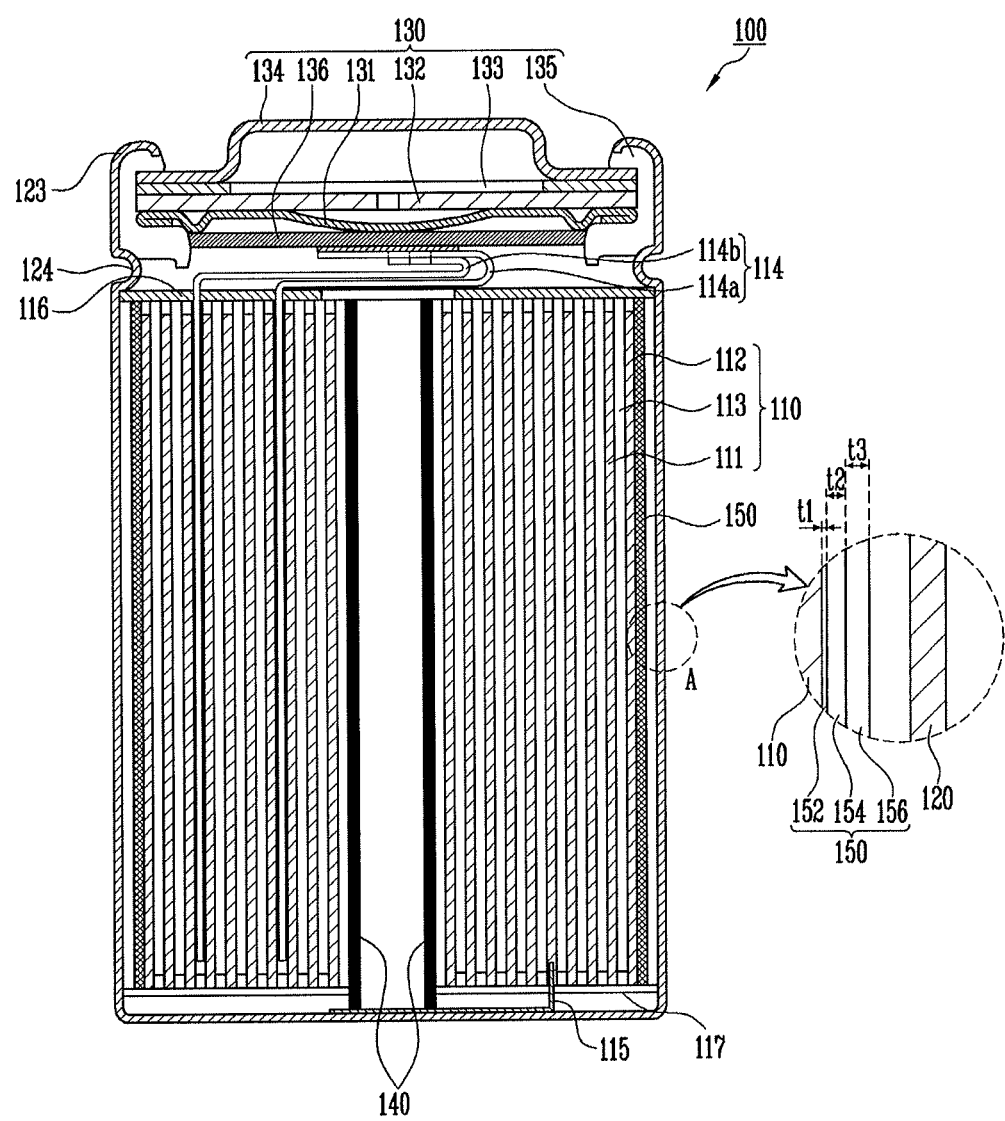
FIG. 4A illustrates a cross-sectional view taken along line I-I' of FIG. 1 before electrolyte impregnation.
Figure 4B:
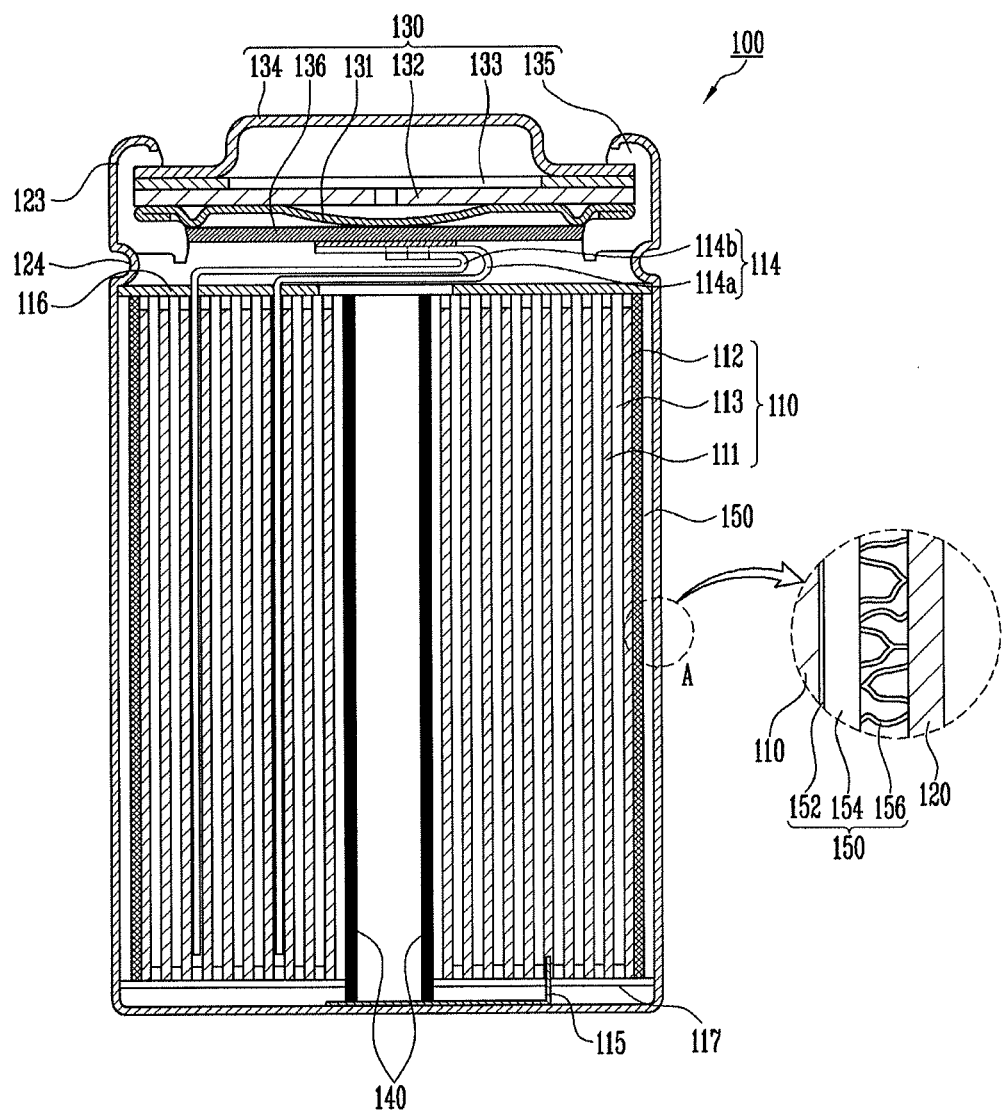
FIG. 4B illustrates a cross-sectional view taken along line I-I' of FIG. 1 after electrolyte impregnation.

FIG. 4A illustrates a cross-sectional view taken along line I-I' of FIG. 1 before electrolyte impregnation. FIG. 4B illustrates a cross-sectional view taken along line I-I' of FIG. 1 after electrolyte impregnation.

As shown in FIGS. 4A and 4B, the finishing member 150 may include the first layer 152 that has one surface attached to the electrode assembly 110. The second layer 154 and the third layer 156, which are different from each other, may be sequentially provided on the other surface of the first layer 152. The second layer 154 and the third layer 156 may react to an electrolyte. For example, the one surface of the first layer 152 may be attached to the electrode assembly 110, and the second layer 154 and the third layer 156 may be sequentially provided on the other surface of the first layer 152. In this case, the first layer 152 may be directly attached to the electrode assembly 110 and may prevent the wound end 119 of the electrode assembly 110 from becoming unfastened from the electrode assembly 110. The first layer 152 does not react to the electrolyte. Accordingly, a thickness t1 of the first layer 152 may be the least that may provide adhesive force to the electrode assembly 110. For example, the thickness t1 of the first layer 152 may be less than a thickness t2 of the second layer 154 and a thickness t3 of the third layer 156. The volumes of the second layer 154 and the third layer 156 are increased when the second layer 154 and the third layer 156 react to the electrolyte. The thickness t2 of the second layer 154 and the thickness t3 of the third layer 156 may be greater than the thickness t1 of the first layer 152 such that swelling of the finishing member 150 may be maximized and the electrode assembly 110 may be more closely attached to an inner surface of the case 120. The thickness t3 of the third layer 156, which firstly reacts to the electrolyte, may be greater than the thickness t2 of the second layer 154, such that a swelling effect may be induced.

Accordingly, the thickness t2 of the second layer 154 may be greater than the thickness t1 of the first layer 152 and less than the thickness t3 of the third layer 156. The thickness t3 of the third layer 156 may be greater than the thickness t1 of the first layer 152 and the thickness t2 of the second layer 154.

The first layer 152, which is directly attached to one surface of the electrode assembly 110 and provides adhesive force to the electrode assembly 110, may include an acrylic resin. The first layer 152 may have a thickness ranging from about 2 μm to about 8 μm. For example, the first layer 152 may have a thickness of 5 μm. The first layer 152 has adhesive force. Accordingly, the first layer 152 may help prevent the wound end 119 of the electrode assembly 110 from becoming unfastened from the electrode assembly 110, such that the electrode assembly 110 may stably maintain a jelly-roll shape. The second layer 154 may be attached to the other surface of the first layer 152 due to the adhesive force of the first layer 152. Unlike the second layer 154 and the third layer 156, the first layer 152 does not react to the electrolyte.

The second layer 154 may be provided on the other surface of the first layer 152. The second layer 154 may have a thickness ranging from about 15 μm to about 25 μm. For example, the second layer 154 may have a thickness of 20 μm. Unlike the first layer 152 and the third layer 156, the second layer 154 may not have adhesive force. Accordingly, the second layer 154 may be provided between the first layer 152 and the third layer 156. One surface of the second layer 154 may be attached to the first layer 152 and the other surface of the second layer 154 may be attached to the third layer 156. A volume of the second layer 154 may be increased when the second layer 154 reacts to the electrolyte. When the electrode assembly 110 to which the finishing member 150 is attached is received in the case 120 and then the electrolyte is injected, the second layer 154 may absorb or react to the electrolyte and may swell. Thus, the third layer 156 provided on an outer surface of the finishing member 150 may be more firmly attached to the case 120.

The second layer 154 may include, for example, polyvinylidene fluoride (PVDF) or urethane that swells by reacting to the impregnated electrolyte. The second layer 154 may additionally include an additive. PVDF swells when PVDF reacts to an organic solvent in the electrolyte, such as, for example, dimethyl carbonate (DMC), ethylene carbonate (EC), diethyl carbonate (DEC), ethyl methyl carbonate (EMC), or propylene carbonate (PC). PVDF may swell in a range from about 0.1 μm to about 0.2 μm, or, for example, from about 0.12 μm to about 0.16 μm.

The third layer 156 may not have adhesive force. In some implementations, the third layer 156 may have adhesive force when the third layer 156 reacts to the electrolyte. The third layer 156 may have a thickness ranging from about 20 μm to about 30 μm. For example, the third layer 156 may have a thickness of 25 μm. Accordingly, when the electrode assembly 110 to which the finishing member 150 is attached is received in the case 120 and then the electrolyte is injected, the third layer 156 may slightly swell, becomes adhesive, cause the electrode assembly 110 to be closely attached to an inner surface of the case 120, and increase adhesive force between the electrode assembly 110 and the case 120.

The third layer 156 may include oriented polystyrene (OPS), the properties of which are changed to become adhesive when OPS reacts to the electrolyte. OPS does not have adhesive force in a normal situation. However, when OPS reacts to at least one of DMC, EC, DEC, EMC, and PC, for example, DMC, OPS may undergo a phase change from a solid state to a viscous liquid state, become adhesive, and be contracted, solidified, and attached to an inner surface of the case 120.

For example, when the electrode assembly 110 to which the finishing member 150 is attached is received in the case 120 and impregnated with the electrolyte, the third layer 156 located on an outer surface of the finishing member 150 may react to the electrolyte to change to a liquid state and become viscous. As the second layer 154 reacts to the electrolyte and swells, the third layer 156 may become contracted, solidified, and attached to the inner surface of the case 120. Accordingly, the third layer 156 may become more closely attached to the inner surface of the case 120 due to the swelling of the second layer 154.

When the second layer 154 reacts to the electrolyte and swells, the third layer 156 may become firmly attached to the inner surface of the case 120. The third layer 156 that is formed of OPS may react to the electrolyte and have high adhesive strength.

As shown in FIG. 4A, the electrode assembly 110 and the inner surface of the case 120 may be spaced apart from each other before the finishing member 150 is impregnated with the electrolyte. As shown in FIG. 4B, when the finishing member 150 is impregnated with the electrolyte, the electrode assembly 110 may become firmly attached to the inner surface of the case 120.

When the adhesive force between the case 120 and the third layer 156 is increased due to swelling of the second layer 154 provided between the first layer 152 and the third layer 156, movement of the electrode assembly 110 and a fracture of the first and second electrode tabs 114 and 115 may be prevented. Thereby, the stability of the secondary battery 100 may be improved. Even when the electrode assembly 110 has a multi-tab structure in which roundness of a jelly-roll structure is relatively low, an alignment state of the electrode assembly 110 may be stably maintained. An increase in a resistance of the secondary battery 100 may be suppressed, and the quality of the secondary battery 100 may be improved.

Experimental Example 1. Identification of Swelling Characteristics of Second Layer In order to identify excellent swelling characteristics of the second layer 154, an experiment was performed as follows.

First, a film including PVDF and an additive and having a thickness of 17.43 μm was prepared. Next, the film was put into a container containing an electrolyte, was impregnated with the electrolyte for a predetermined period of time, and then was taken out of the container. A thickness of the film was measured, and a cross-section of the film was observed using an optical microscope.

Figure 5:
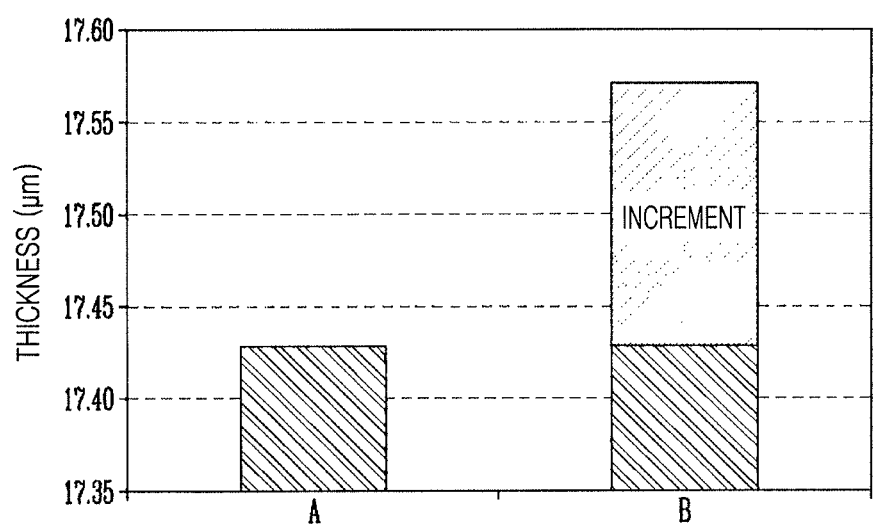
FIG. 5 illustrates a graph depicting a state A before electrolyte impregnation and a state B after the electrolyte impregnation.
Figure 6:
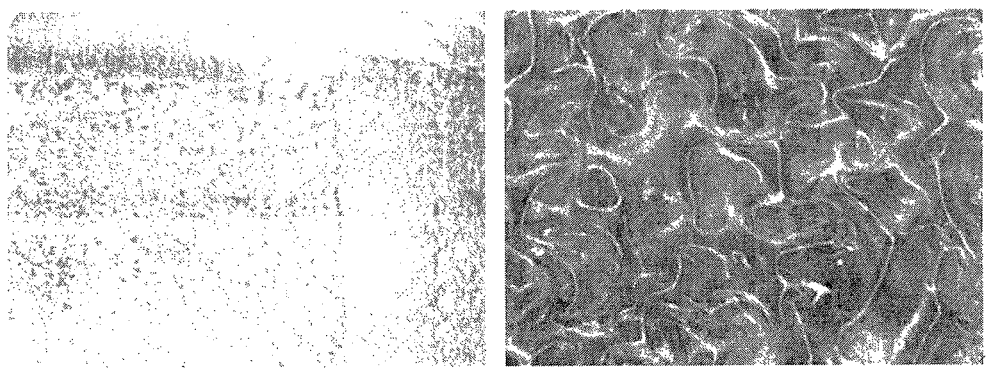
FIG. 6 illustrates two images with different magnifications from each other, obtained using an optical microscope, of a film in the state B after the electrolyte impregnation.

FIG. 5 illustrates a graph representing a state A before electrolyte impregnation and a state B after the electrolyte impregnation. FIG. 6 illustrates two images, obtained using an optical microscope at different magnifications, of a film in the state B after the electrolyte impregnation.

As shown in the graph illustrated in FIG. 5, a thickness of the film in the state A before the electrolyte impregnation was 17.43 µm, whereas a thickness of the film in the state B after the electrolyte impregnation was 17.57 µm. Thus, it was found that a thickness of the film increased by about 0.14 µm. It was also found from the images of FIG. 6 that an interval between particles was increased.

Accordingly, it was found that the film including PVDF and the additive swelled.

By way of summation and review, a lithium secondary battery may be assembled by receiving an electrode assembly in a case such as a pouch or a can, injecting an electrolyte, and sealing the case. An example of an electrode assembly includes a jelly-roll type electrode assembly in which a sandwich of a positive electrode plate, a separator, and a negative electrode plate is wound into a roll shape. Finishing tape is attached to an outer cross-section of a jelly-roll type electrode assembly in order to fasten a finished portion. The jelly-roll type electrode assembly to which the finishing tape is attached is received in a case, an electrolyte is injected into the case, and the case is sealed.

However, in such a configuration of a secondary battery, when the electrode assembly is inserted into a can, the electrode assembly may not be closely attached to an inner side surface of a case. Accordingly, when an external impact is applied to the secondary battery, the electrode assembly may move vertically or horizontally, thereby damaging an electrode tab. Also, an electrolyte including a lithium salt or the like may act as a lubricant and promote the movement of the electrode assembly, thereby leading to an internal short-circuit. Various studies have been made to provide methods of preventing movement of an electrode assembly in a case and damage to an electrode tab.

One or more embodiments include a configuration of a finishing member that may increase adhesive force between an electrode assembly and an inner surface of a case.

One or more embodiments include a finishing member optimized for an electrode assembly including multi-tabs.

As described above, according to embodiments of a secondary battery, a finishing member includes a second layer. Thus, an electrode assembly is more closely attached to an inner surface of a case. Movement of the electrode assembly and a fracture of an electrode tab may be prevented, thereby improving the stability of the secondary battery.

Also, according to embodiments, an alignment state of the electrode assembly is stably maintained even when the electrode assembly has a multi-tab structure in which roundness of a jelly-roll structure is poor. An increase in a resistance of the secondary battery may be prevented and the quality of the secondary battery may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof.

What is claimed is:

1. A secondary battery, comprising:
   an electrode assembly including a first electrode plate, a second electrode plate, and a separator between the first electrode plate and the second electrode plate;
   a case in which the electrode assembly and an electrolyte are received; and
   a finishing member attached to an outer surface of the electrode assembly,
   wherein:
   the finishing member includes a first layer, a second layer, and a third layer,
   the first layer has one surface attached to the electrode assembly,
   the second layer and the third layer are different from each other and are sequentially provided on another surface of the first layer, and
   the second layer and the third layer react to the electrolyte.

2. The secondary battery as claimed in claim 1, wherein the second layer is thicker than the first layer and thinner than the third layer.

3. The secondary battery as claimed in claim 1, wherein the third layer is thicker than the first layer and the second layer.

4. The secondary battery as claimed in claim 1, wherein the first layer includes an acrylic resin.

5. The secondary battery as claimed in claim 1, wherein the second layer includes polyvinylidene fluoride (PVDF) or urethane.

6. The secondary battery as claimed in claim 1, wherein the third layer includes oriented polystyrene (OPS).

7. The secondary battery as claimed in claim 1, wherein, in a state in which the finishing member is impregnated with the electrolyte, the third layer is attached to an inner surface of the case and the second layer has increased volume, compared to a state in which the finishing member has not been impregnated with the electrolyte.

8. The secondary battery as claimed in claim 7, wherein the second layer swells in the state in which the finishing member is impregnated with the electrolyte.

9. The secondary battery as claimed in 1, wherein the first electrode plate includes:
   a plurality of uncoated portions to which a first active material is not applied; and
   a plurality of first electrode tabs respectively attached to the plurality of uncoated portions and extending upwardly.

10. The secondary battery as claimed in claim 1, wherein:
    the finishing member is provided on at least one surface of the electrode assembly, or
    the finishing member is provided on one surface of the electrode assembly and on another surface of the electrode assembly, the another surface of the electrode assembly being opposite to the one surface of the electrode assembly.

11. The secondary battery as claimed in claim 10, wherein the one surface of the electrode assembly includes a portion where a wound end of the electrode assembly is located.

12. The secondary battery as claimed in claim 11, wherein the one surface of the electrode assembly does not match a portion of an outer circumferential surface of the electrode assembly where a first electrode tab is located.

13. The secondary battery as claimed in claim 1, wherein the finishing member surrounds an entirety of the outer surface of the electrode assembly.

* * * * *